(12) United States Patent
Frantz et al.

(10) Patent No.: US 9,239,087 B2
(45) Date of Patent: Jan. 19, 2016

(54) BRAKE COVER PLATE

(75) Inventors: Sven Frantz, Gifhorn (DE); Horst Klopp, Isenbüttel (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 13/702,439

(22) PCT Filed: Jun. 9, 2011

(86) PCT No.: PCT/EP2011/002833
§ 371 (c)(1),
(2), (4) Date: Dec. 6, 2012

(87) PCT Pub. No.: WO2011/157378
PCT Pub. Date: Dec. 22, 2011

(65) Prior Publication Data
US 2013/0077908 A1 Mar. 28, 2013

(30) Foreign Application Priority Data
Jun. 19, 2010 (DE) .......................... 10 2010 024 417

(51) Int. Cl.
*F16D 65/00* (2006.01)
*F16D 55/00* (2006.01)
*F16C 33/80* (2006.01)

(52) U.S. Cl.
CPC .......... *F16D 65/0081* (2013.01); *F16C 33/805* (2013.01); *F16D 55/00* (2013.01); *F16D 2055/0037* (2013.01)

(58) Field of Classification Search
CPC .......................... F16D 65/0081; F16C 33/805

USPC ........... 188/218 A, 18 A, 206 A, 206 R, 328, 188/71.6, 264 A, 264 AA; 384/480
See application file for complete search history.

(56) References Cited

U.S. PATENT DOCUMENTS

| | | | | |
|---|---|---|---|---|
| 4,005,768 A | * | 2/1977 | Bubnash et al. | 188/218 A |
| 4,155,601 A | * | 5/1979 | Ito | 301/6.8 |
| 4,197,926 A | | 4/1980 | Youngdale | |

(Continued)

FOREIGN PATENT DOCUMENTS

| | | |
|---|---|---|
| DE | 2814252 A1 | 10/1978 |
| DE | 2950057 A1 | 6/1981 |

(Continued)

OTHER PUBLICATIONS

Search Report for German Patent Application No. 10 2010 024 417.1; Dec. 21, 2011.

(Continued)

*Primary Examiner* — Thomas J Williams
*Assistant Examiner* — Mariano Sy
(74) *Attorney, Agent, or Firm* — Barnes & Thornburg LLP

(57) ABSTRACT

A brake cover plate for a disc brake of a motor vehicle having a plate-like section for covering a brake disc. An annular elevation which is spaced apart from the outer edge of the brake cover plate is formed on the side facing the brake disc as a wheel-bearing pre-seal. Furthermore, the brake cover plate forms a fastening flange radially within the annular elevation in order to fix the brake cover plate to a wheel carrier or the like. A wheel-bearing pre-seal is integrated into the brake cover plate via the annular elevation, the wheel-bearing pre-seal reducing the soiling of a wheel bearing thus improving the service life of the latter.

15 Claims, 4 Drawing Sheets

(56) References Cited

U.S. PATENT DOCUMENTS

| | | | | |
|---|---|---|---|---|
| 4,207,971 | A | * | 6/1980 | Ishikawa et al. .......... 188/218 A |
| 4,253,552 | A | * | 3/1981 | Shibatani et al. ......... 188/218 A |
| 4,317,508 | A | * | 3/1982 | Katagiri et al. ........... 188/218 A |
| 4,484,667 | A | * | 11/1984 | Bottieri, Jr. ............... 188/218 A |
| 5,735,370 | A | * | 4/1998 | Nitta et al. ................ 188/218 A |
| 5,998,987 | A | * | 12/1999 | Ikeuchi et al. ................ 324/173 |
| 6,371,260 | B2 | * | 4/2002 | Aydt ........................ 188/218 A |
| 6,626,272 | B2 | * | 9/2003 | Frouin ...................... 188/218 A |
| 7,341,130 | B2 | * | 3/2008 | Samuelsson ............. 188/218 A |

FOREIGN PATENT DOCUMENTS

| | | |
|---|---|---|
| DE | 3824917 A1 | 1/1990 |
| DE | 3942651 C1 | 7/1991 |
| DE | 19751915 A1 | 5/1999 |
| DE | 19850257 A1 | 5/2000 |
| DE | 10047468 A1 | 4/2002 |
| DE | 10336798 A1 | 3/2005 |
| DE | 10348001 A1 | 5/2005 |
| DE | 102004044514 A1 | 3/2006 |
| DE | 102007010290 A1 | 9/2008 |
| DE | 102007040581 A1 | 3/2009 |
| FR | 2782359 A1 | 2/2000 |
| JP | 10246256 A | 9/1998 |
| JP | 2005239026 A | 9/2005 |
| JP | 2008048493 A | 2/2008 |

OTHER PUBLICATIONS

Search Report for International Patent Application No. PCT/EP2011/002833; Feb. 18, 2013.

* cited by examiner

BRAKE COVER PLATE

PRIORITY CLAIM

This patent application is a U.S. National Phase of International Patent Application No. PCT/EP2011/002833, filed 9 Jun. 2011, which claims priority to German Patent Application No. 10 2010 024 417.1, filed 19 Jun. 2010, the disclosures of which are incorporated herein by reference in their entirety.

FIELD

Disclosed embodiments relate to a brake cover plate for a disk brake of a motor vehicle, comprising a dish-like portion for covering a brake disk.

BACKGROUND

Brake cover plates are conventionally arranged on the vehicle-inner side of brake disks and protect the latter against dirt and water spray. The brake cover plates thus ensure good response during an actuation of the brake and reduce wear of the brake disks and brake pads. Furthermore, wet fading is prevented. Aside from the protective function, brake cover plates also serve to shield the components of a wheel suspension against the action of heat generated during intense loading of the brake.

Brake cover plates are known, for example, from DE 28 14 252 A1, DE 103 36 798 A1 and DE 10 2004 044 514 A1. For fastening to a wheel carrier, there may be provided on the brake cover plate a central fastening flange which, as disclosed in DE 28 14 252 A1, is screwed to the wheel carrier. Such a fastening has however hitherto not been adequately stable. Furthermore, the brake cover plate can be excited so as to perform undesired vibrations. It is therefore proposed in DE 103 36 798 A1 that the brake cover plate be fastened with an interference fit to a central projection of the wheel carrier or to an axle journal provided thereon.

With conventional brake cover plates, normally only the brake disk and the brake pads are protected against dirt and water spray. It is nevertheless not possible to rule out the action of dirt on the wheel bearing despite the provision of a brake cover plate. For this reason, wheel bearings usually have a sealed rolling bearing arrangement which, as described for example in DE 10 2007 010 290 A1 and DE 10 2007 040 581 A1, may additionally have a pre-seal positioned in front of it. In DE 10 2007 010 290 A1, the pre-seal is in the form of a sealing ring mounted in front of the wheel bearing, which sealing ring must be mounted separately. Also, in DE 10 2007 040 581 A1, the pre-seal is realized by an annular body which must be produced and mounted separately and which is held clamped between an inner ring of the rolling bearing arrangement and a shoulder of the wheel carrier.

SUMMARY

Disclosed embodiments reduce the production and assembly outlay for a wheel bearing pre-seal by means of a brake cover plate. The brake cover plate comprises a dish-like portion for covering a brake disk and, on the side pointing toward the brake disk, there is formed an annular elevation which is spaced apart from the outer edge of the brake cover plate, as a wheel bearing pre-seal, and the brake cover plate forms, radially within the annular elevation, a fastening flange for fixing the brake cover plate to a wheel carrier or the like.

As a result of the integration of the wheel bearing pre-seal into the brake cover plate, the production and mounting of a separate component are dispensed with, and corresponding outlay is eliminated. The brake cover plate is furthermore simple and inexpensive to assemble.

Further embodiments are disclosed in the patent claims.

For example, the annular elevation on the brake cover plate may be designed so as to project axially further in the direction of the brake disk than the fastening flange. In this way, it is possible without great outlay for the actual seal of the rolling bearing arrangement to have positioned in front of it a labyrinth which adequately fulfils the task of a pre-seal, specifically of protecting the bearing seal against the action of dirt.

To fix the fastening flange of the brake cover plate, the fastening flange may be pressed onto a wheel carrier or the like. This permits simple and inexpensive assembly in conjunction with highly stable retention. In particular, this results in a rigid structure such that disturbing vibration excitation of the brake cover plate is prevented by virtue of the first natural frequency being shifted toward a higher frequency.

In a further disclosed embodiment, the annular elevation is formed by an annular projection formed on the brake cover plate, the radially outer flank of which annular projection merges into a portion for covering the brake disk, or the dish-like portion, and the radially inner flank of which annular projection merges into the fastening flange. The brake cover plate can thus be produced in one piece as a sheet-metal molded part from one sheet-metal blank. For the wheel bearing pre-seal, no additional outlay other than a corresponding adaptation of the molding tool is required.

BRIEF DESCRIPTION OF THE DRAWINGS

The invention will be explained in more detail below on the basis of disclosed embodiments illustrated in the drawings, in which.

DETAILED DESCRIPTION OF THE DISCLOSED EMBODIMENTS

Figure 1:
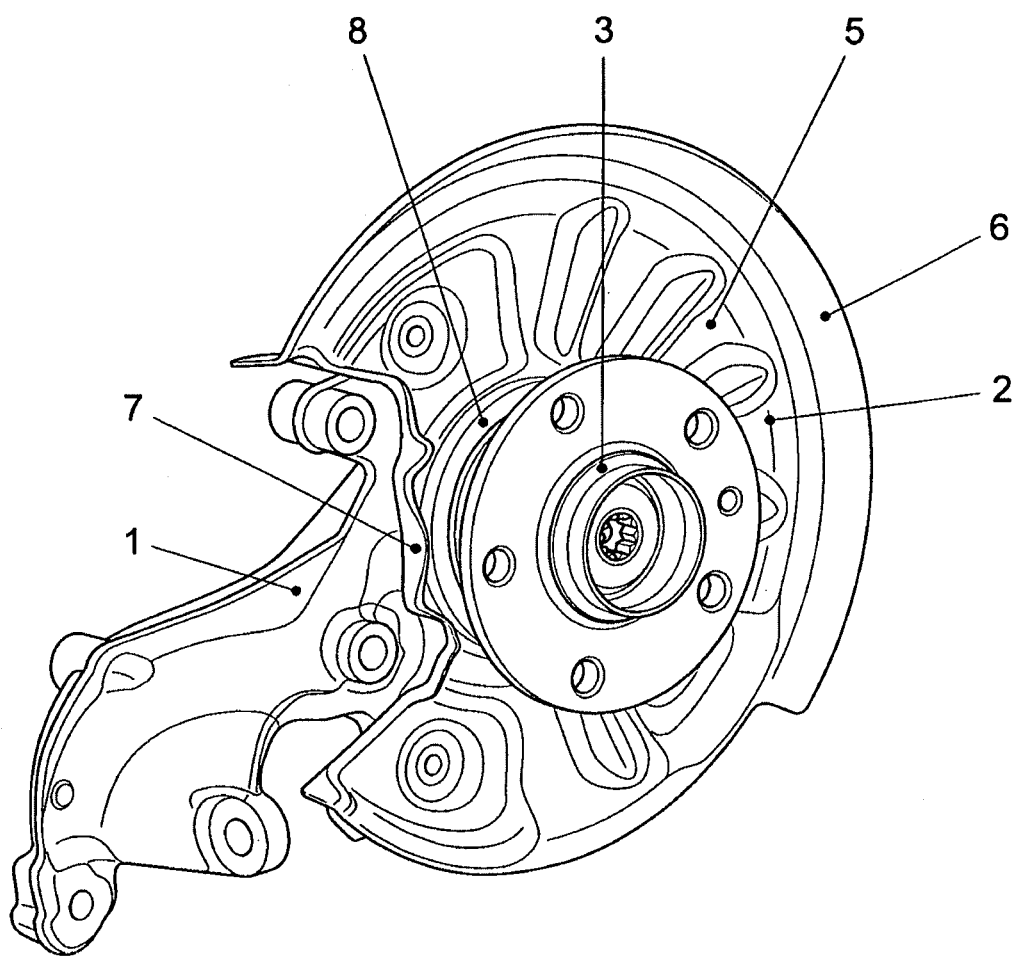
FIG. 1 shows a three-dimensional view of an arrangement composed of a wheel carrier, a wheel bearing and a brake cover plate.

The brake cover plate discussed above may be used in an arrangement of a wheel carrier and a wheel bearing, specifically in such a way that the annular elevation of the brake cover plate radially overlaps an end portion of the wheel bearing. This makes it possible to realize a pre-seal for the wheel bearing which offers adequate protection against the action of dirt. The service life of the wheel bearing is improved in this way.

The wheel bearing may comprise a wheel hub which is rotatably mounted by means of a rolling bearing arrangement. The rolling bearing arrangement has, toward the side of the wheel bearing, a bearing seal which points toward the fastening portion of the brake disk. An encircling labyrinth seal as a wheel bearing pre-seal which has a substantially L-shaped profile and which prevents the advance of dirt particles is hereby formed between the bearing seal and fastening portion and the annular elevation and radially outer side of the wheel bearing.

In a further disclosed embodiment, the bearing seal has a web which projects radially beyond the wheel hub and which projects into the wheel bearing pre-seal. In this way, the advance of dirt particles to the actual bearing seal is further hindered.

The brake cover plate may in principle be fixed in a clamped manner between an inner ring of the rolling bearing arrangement and the wheel carrier. In an advantageous refinement, the fastening portion of the brake cover plate is however pressed with an inner edge onto a portion of the wheel carrier, so as to yield a connection with high rigidity.

The disclosed embodiment illustrated in FIGS. 1 to 4 shows a wheel carrier 1 of a motor vehicle rear axle, to which wheel carrier is fastened a brake cover plate 2. Also provided on the wheel carrier 1 is a wheel bearing 3 for a vehicle wheel. Furthermore, a brake disk 4 of a brake disk (not illustrated in any more detail otherwise) is fastened to the wheel bearing 3.

The brake cover plate 2 is formed in one piece, as a trimmed sheet-metal molded part, from one sheet-metal blank, and by means of a dish-like portion 5, covers the brake disk 4 in the direction of the vehicle. Here, an outer edge 6 of the dish-like portion 5 projects radially beyond the brake disk 4. A recess or cavity 7 for a brake caliper is also formed on the brake cover plate 2.

An annular elevation 8 which serves as a wheel bearing pre-seal is formed on the brake cover plate 2 adjacent to the disk-like portion 5 of the brake cover plate 2, in a region around the wheel bearing 3 and on the side pointing toward the brake disk 4. The annular elevation 8 runs concentrically around the wheel axis A. The elevation is formed by an annular projection formed on the brake cover plate 2, which annular projection is spaced apart radially from the outer edge 6 of the brake cover plate 2. Here, the dish-like portion 5 merges via a smooth curvature into a radially outer flank 9 of the annular elevation 8. A radially inner flank 10 of the annular projection or of the annular elevation 8 is adjoined, radially at the inside, by a fastening flange 11. The latter is likewise integrated in one piece into the brake cover plate 2. Here, the annular elevation 8 projects axially further in the direction of the brake disk 4 than the fastening flange 11, which is set back in relation to the elevation 8.

Figure 2:
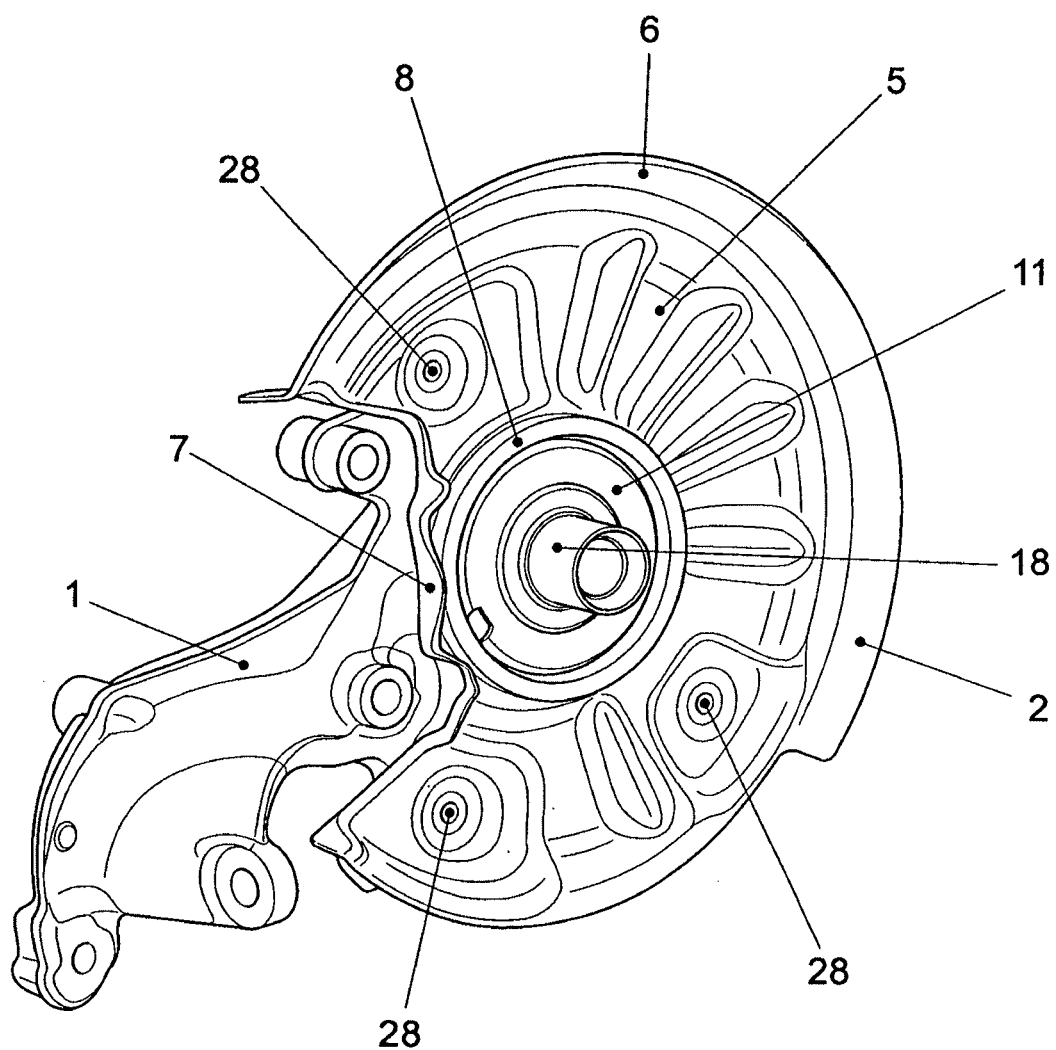
FIG. 2 shows a view of the arrangement from FIG. 1 without a wheel bearing.
Figure 3:
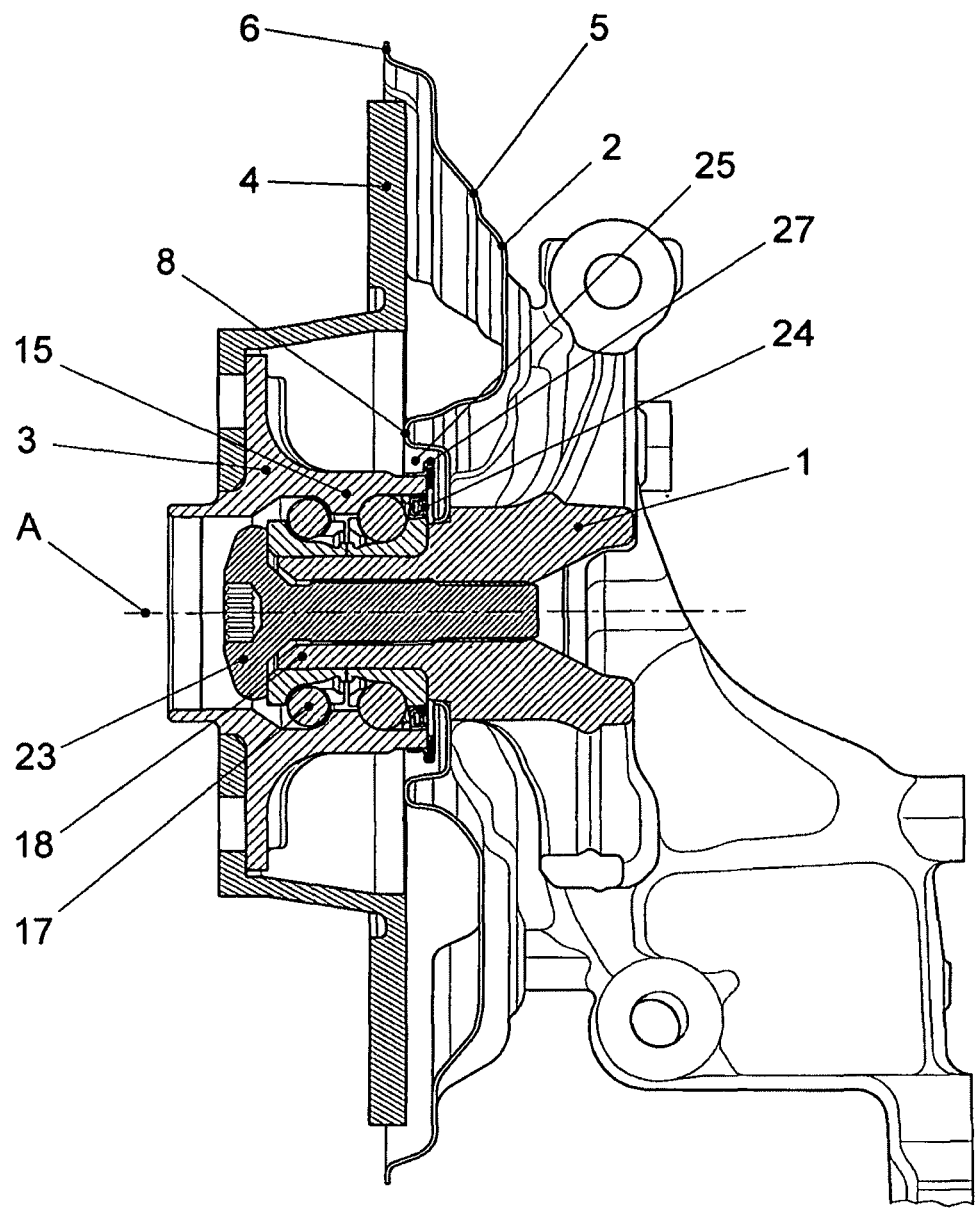
FIG. 3 shows a sectional view of the arrangement from FIG. 1.
Figure 4:
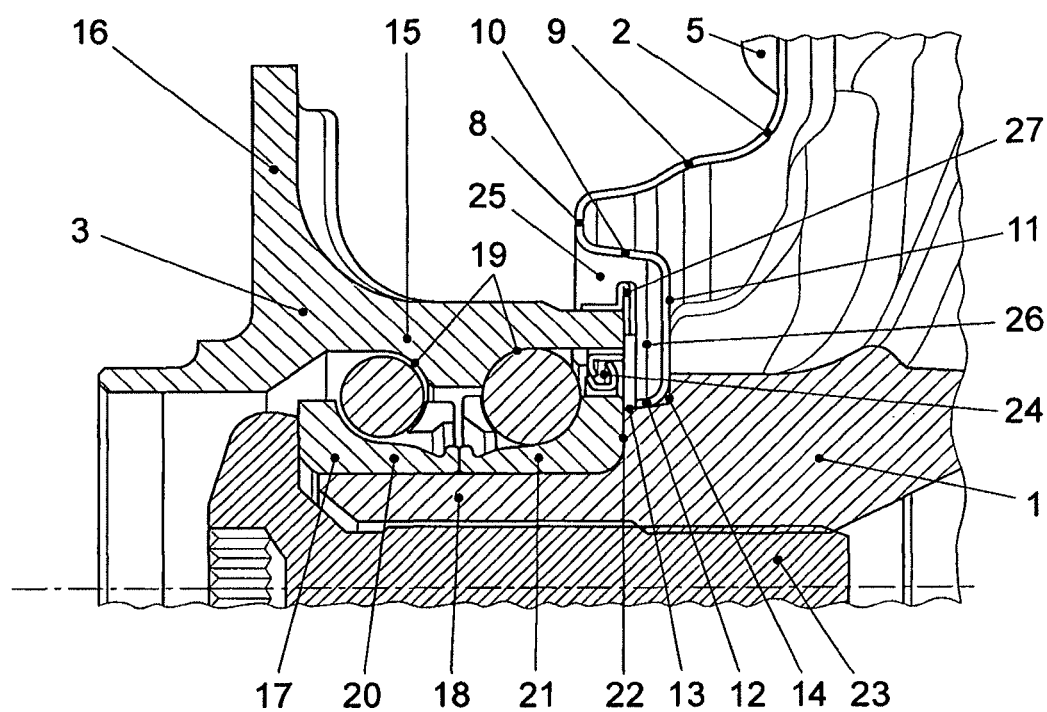
FIG. 4 shows a detail view of the wheel bearing pre-seal integrated into the brake cover plate.

The fastening flange 11 which extends radially within the annular elevation 8 serves for fixing the brake cover plate 2 to the wheel carrier 1. In the disclosed embodiment illustrated, the brake cover plate 2 is pressed onto the wheel carrier 1. For this purpose, the fastening flange 11 is seated with its inner edge 12 on an offset 13 of the wheel carrier 1, as shown in FIG. 4. Here, the offset 13 is concentric with respect to the wheel axis A. Here, the fastening flange 11 bears axially against a shoulder 14 formed on the wheel carrier 1. To improve the interference fit, the inner edge 12 of the fastening flange 11 may be turned out toward the wheel bearing 3, such that an encircling collar is formed in order to increase the support length in the axial direction. Furthermore, the brake cover plate 2 may additionally be screwed to the wheel carrier 1 at one or more points. In this regard, FIGS. 1 and 2 show in each case three fastening openings 28 arranged, in the region of the dish-like portion 5, radially outside the annular elevation 8.

By means of the brake cover plate 2 discussed above, and in particular the annular elevation 8 thereof, a wheel bearing pre-seal for the wheel bearing 3 is realized. The latter comprises a wheel hub 15 with a wheel flange 16 to which the brake disk 4 and also a vehicle wheel (not illustrated in any more detail) are fastened. The wheel bearing 3 also comprises a rolling bearing arrangement 17 by means of which the wheel hub 15 is rotatably mounted on an axle journal 18 of the wheel carrier 1. Here, the axle journal 18 may be integrally formed directly on the wheel carrier 1 or else may be fastened to the latter. In the disclosed embodiment illustrated, the rolling bearing arrangement 17 comprises two angular-contact ball bearings in an X arrangement, wherein the outer raceways 19 are formed in the wheel hub 15. Inner raceways are situated on two bearing inner rings 20 and 21 which are pushed onto the axle journal 18 in series and which are supported axially on an abutment shoulder 22 formed on the wheel carrier 1. Clamping is realized by means of a central bolt 23 which is screwed into the wheel carrier 1 or which, as an alternative to the illustration in FIG. 4, is guided through the wheel carrier 1 and screwed by means of a nut.

The rolling bearing arrangement 17 comprises, at its side pointing toward the wheel carrier 1, a bearing seal 24. The bearing seal 24 has positioned in front of it the wheel bearing pre-seal realized by the brake cover plate 2, as a result of which the action of dirt on the bearing seal 24 is reduced considerably, and thus the service life of the wheel bearing and in particular of the rolling bearing arrangement 17 is increased.

As emerges in particular from FIG. 4, the annular elevation 8 of the brake cover plate 2 overlaps a wheel-carrier-side end portion of the wheel bearing 3 or of the wheel hub 15 radially, such that an annular gap 25 is formed between the inner flank 10 of the annular elevation 8 and the outer circumference of the wheel-carrier-side end portion of the wheel hub 15. At the same time, the axial face end of the wheel hub 15 and the rolling bearing arrangement 17 is spaced apart axially from the fastening flange 11 of the brake cover plate 2 by a gap 26. The two gaps 25 and 26 form a labyrinth, which is encircling around the wheel axis A and which is of L-shaped profile, as a wheel bearing pre-seal.

The bearing seal 24 has, within the wheel bearing pre-seal, an encircling web 27 which projects radially beyond the wheel hub 15, whereby the labyrinth action is further intensified. The web 27 may be formed by a bearing cover.

In a modification of the illustrated disclosed embodiment, the brake cover plate 2 may also be fixed in a clamped manner between the rolling bearing arrangement 17 and the abutment shoulder 22 of the wheel carrier 1.

As a result of the integration of the wheel bearing pre-seal into the brake cover plate 2, it is possible for conventional pre-sealing elements to be dispensed with, as a result of which the assembly outlay for a pre-seal of the type is reduced. Since the annular elevation 8 can be realized directly during the forming of a brake cover plate 2, no additional outlay is involved by comparison with the production of conventional brake cover plates 2 without a wheel bearing pre-seal.

As a result of the pressing of the brake cover plate 2 onto the wheel carrier 1, high rigidity of the structure thus formed is attained. Furthermore, disturbing vibration excitation of the brake cover plate 2 is prevented.

The invention has been explained in more detail above on the basis of disclosed embodiments. The invention is, however, not restricted thereto but rather encompasses all refinements defined by the patent claims.

LISTS OF REFERENCE NUMERALS

1 Wheel carrier
2 Brake cover plate
3 Wheel bearing
4 Brake disk

5 Dish-like portion
6 Outer edge
7 Recess
8 Annular portion
9 Outer flank
10 Inner flank
11 Fastening flange
12 Inner edge
13 Offset
14 Shoulder
15 Wheel hub
16 Wheel flange
17 Rolling bearing arrangement
18 Axle journal
19 Raceway
20 Bearing inner ring
21 Bearing inner ring
22 Abutment shoulder
23 Bolt
24 Bearing seal
25 Annular gap
26 Gap
27 Web
28 Fastening opening

The invention claimed is:

1. An assembly for a vehicle comprising:
a wheel carrier;
a wheel bearing that includes a wheel hub, which is rotatably mounted via a rolling bearing arrangement, wherein the rolling bearing arrangement includes outer raceways formed in the wheel hub and inner raceways in an axle journal supported by a shoulder of the wheel carrier, wherein the rolling bearing arrangement includes a bearing seal provided toward a side of another component, wherein the bearing seal points toward a fastening flange of a vehicle brake disk;
a brake cover plate for the vehicle brake disk; and
a dish shaped portion that covers the vehicle brake disk, wherein, on a side of the dish shaped portion pointing toward the vehicle brake disk, there is formed an annular elevation, the annular elevation being spaced apart from an outer edge of the brake cover plate and providing a wheel bearing pre-seal,
wherein the brake cover plate forms, radially within the annular elevation, the fastening flange that fixes the brake cover plate to the another component, and
wherein the annular elevation is formed by an annular projection formed on the brake cover plate, wherein a radially outer flank of the annular projection merges into a portion that covers the brake disk and a radially inner flank of the annular projection merges into the fastening flange.

2. The assembly of claim 1, wherein the annular elevation projects axially further in the direction of the brake disk than the fastening flange.

3. The brake cover plate of claim 2, wherein, to fix the brake cover plate, the fastening flange is pressed onto the another component.

4. The assembly of claim 1, wherein, to fix the brake cover plate, the fastening flange is pressed onto the another component.

5. The brake cover plate of claim 1, wherein the another component is a wheel carrier.

6. A brake cover assembly comprising:
a wheel carrier;
a wheel bearing that includes a wheel hub, which is rotatably mounted via a rolling bearing arrangement, wherein the rolling bearing arrangement includes outer raceways formed in the wheel hub and inner raceways in an axle journal supported by a shoulder of the wheel carrier, wherein the rolling bearing arrangement includes a bearing seal provided toward a side of another component, wherein the bearing seal points towards a fastening flange of a brake disk;
a brake cover plate, wherein the another component is coupled to the brake cover plate, and the brake cover plate includes a dish shaped portion having an annular elevation formed on a side of the plate pointing toward a brake disk,
wherein the annular elevation is spaced apart from an outer edge of the brake cover plate, and provides a wheel bearing pre-seal,
wherein the brake cover plate also forms, radially within the annular elevation, the fastening flange that fixes the brake cover plate to the another component,
wherein the annular elevation of the brake cover plate radially overlaps an end portion of the wheel bearing, and
wherein the annular elevation is formed by an annular projection formed on the brake cover plate, wherein a radially outer flank of the annular projection merges into a portion that covers the brake disk and a radially inner flank of the annular projection merges into the fastening flange.

7. The assembly of claim 6,
further comprising a labyrinth seal configured as a wheel bearing pre-seal with an approximately L-shaped profile being formed between the bearing seal, the fastening flange, the annular elevation and radially outer side of the wheel bearing.

8. The assembly of claim 7, wherein the bearing seal has, within the wheel bearing pre-seal, a web which projects radially beyond the wheel hub.

9. The assembly of claim 8, wherein the fastening flange has an inner edge and is pressed against the inner edge onto a portion of the another component.

10. The assembly of claim 7, wherein the another component is a wheel carrier.

11. The assembly of claim 7, wherein the fastening flange has an inner edge and is pressed against the inner edge onto a portion of the another component.

12. The assembly of claim 6, wherein the fastening flange has an inner edge and is pressed against the inner edge onto a portion of the another component.

13. The assembly of claim 6, wherein the annular elevation projects axially further in the direction of the brake disk than the fastening flange.

14. The assembly of claim 6, wherein, to fix the brake cover plate, the fastening flange is pressed onto the another component.

15. The assembly of claim 6, wherein the another component is a wheel carrier.

* * * * *